Feb. 23, 1960 — T. R. SMITH — 2,925,665
CLOTHES DRIER WITHOUT CASING
Filed April 8, 1957 — 5 Sheets-Sheet 1

Inventor
Thomas R. Smith
by James S. Nettleton
Attorney

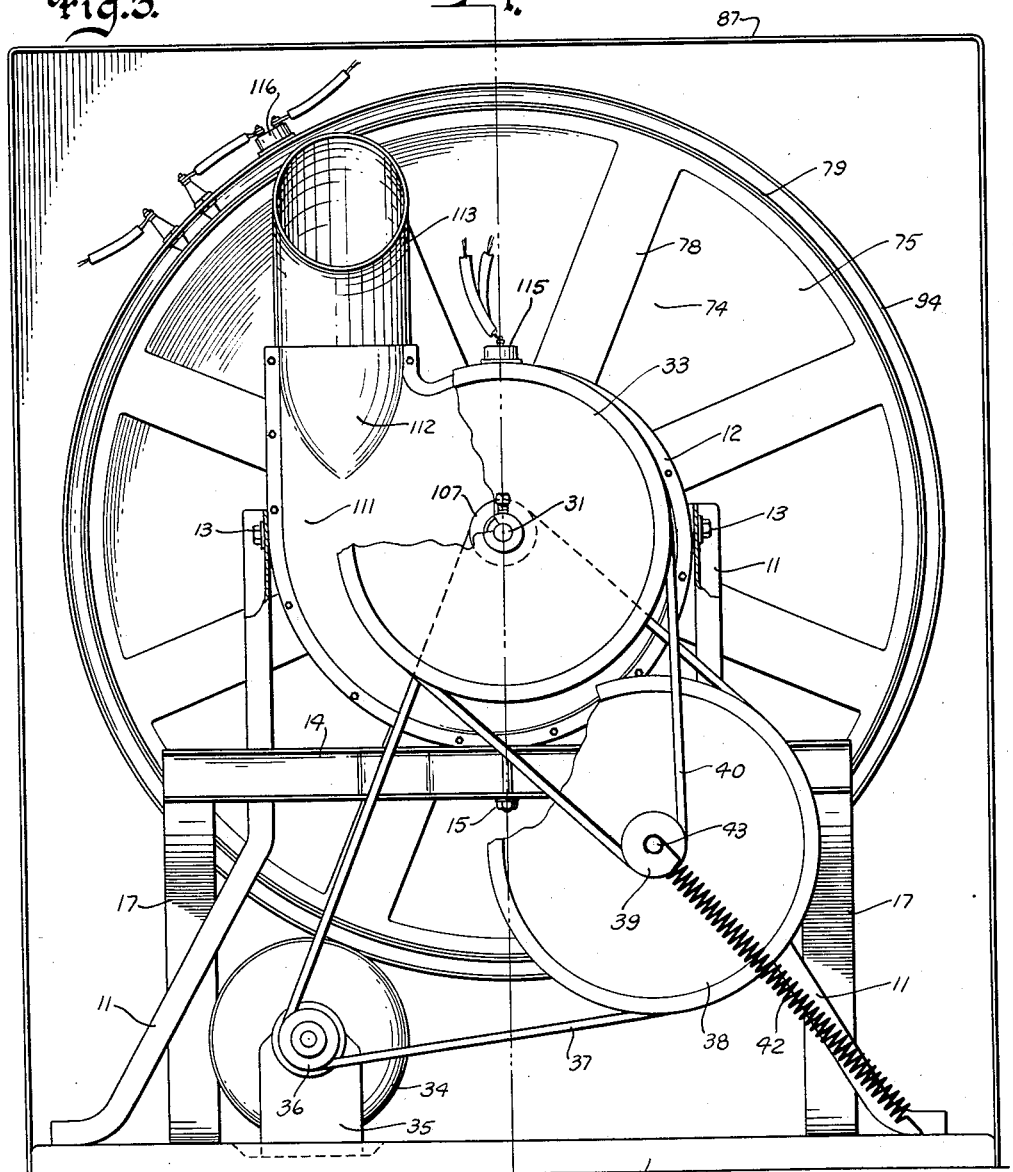
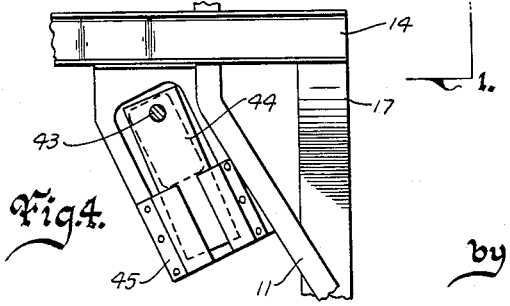

Feb. 23, 1960 T. R. SMITH 2,925,665
CLOTHES DRIER WITHOUT CASING
Filed April 8, 1957 5 Sheets-Sheet 3

Inventor
Thomas R. Smith
by James S. Nettleton
Attorney

Feb. 23, 1960     T. R. SMITH     2,925,665
CLOTHES DRIER WITHOUT CASING
Filed April 8, 1957     5 Sheets-Sheet 4

Inventor
Thomas R. Smith
by James S. Nettleton
Attorney

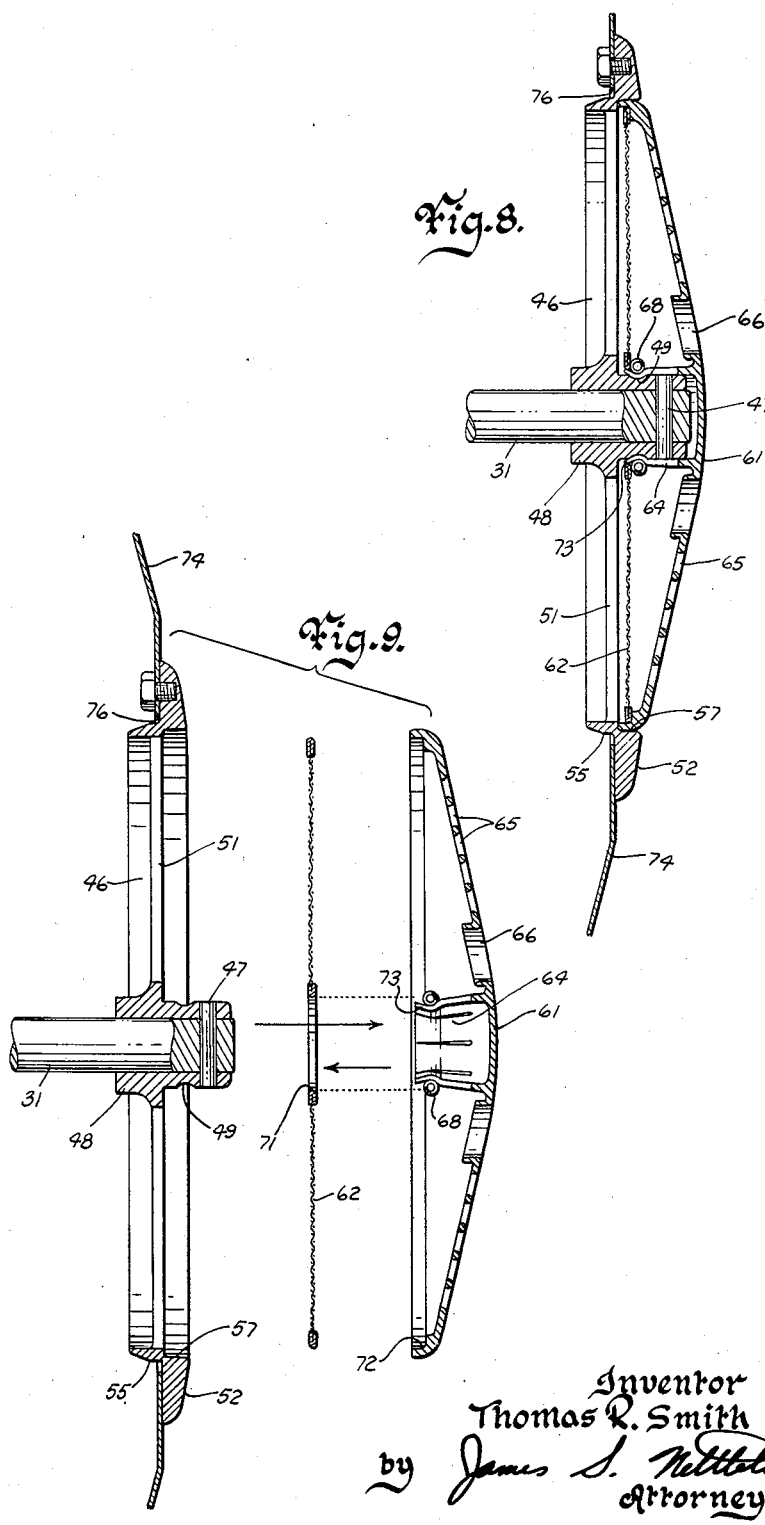

United States Patent Office 2,925,665
Patented Feb. 23, 1960

2,925,665

CLOTHES DRIER WITHOUT CASING

Thomas R. Smith, Newton, Iowa, assignor to The Maytag Company, Newton, Iowa, a corporation of Delaware Application April 8, 1957, Serial No. 651,293

21 Claims. (Cl. 34—82)

This invention relates to a clothes drying appliance. It specifically relates to a clothes drier provided with a revoluble drum through which air is moved to effect the desired drying action without requiring the use of an encompassing stationary casing often incorporated in domestic clothes driers. This invention is also directed toward a clothes drier provided with a unique lint trap assembly and a novel air exhaust system for filtering and discharging the hot moisture vapors from the interior of the drier drum during its rotation in the drying operation.

The drier construction forming the basis for this invention is produced by providing a horizontally mounted clothes receiving drum with a centrally located air exhaust opening in its rear wall which is affixed to a revoluble drum drive shaft journalled in a blower housing provided with an air intake conduit aligned with the exhaust opening in the rear drum wall. Air, preheated prior to its passage into the front portion of the drum, is moved transversely through the drum and its tumbling contents and into the blower housing by the suction created by the rotation of an impeller revolubly mounted on the drum drive shaft within the blower housing. A removable lint trap assembly positioned over the exhaust opening in the rear drum wall filters all air prior to its discharge from the drum and entry into the blower housing.

In the accompanying drawings:

Figure 3 is a rear elevational view, partially broken away, of the drier shown in Figure 1;

Figure 4 is an enlarged fragmentary view showing the means for supporting one of the pulleys forming part of the speed reduction unit for the drier shown in Figure 3;

Figure 1:
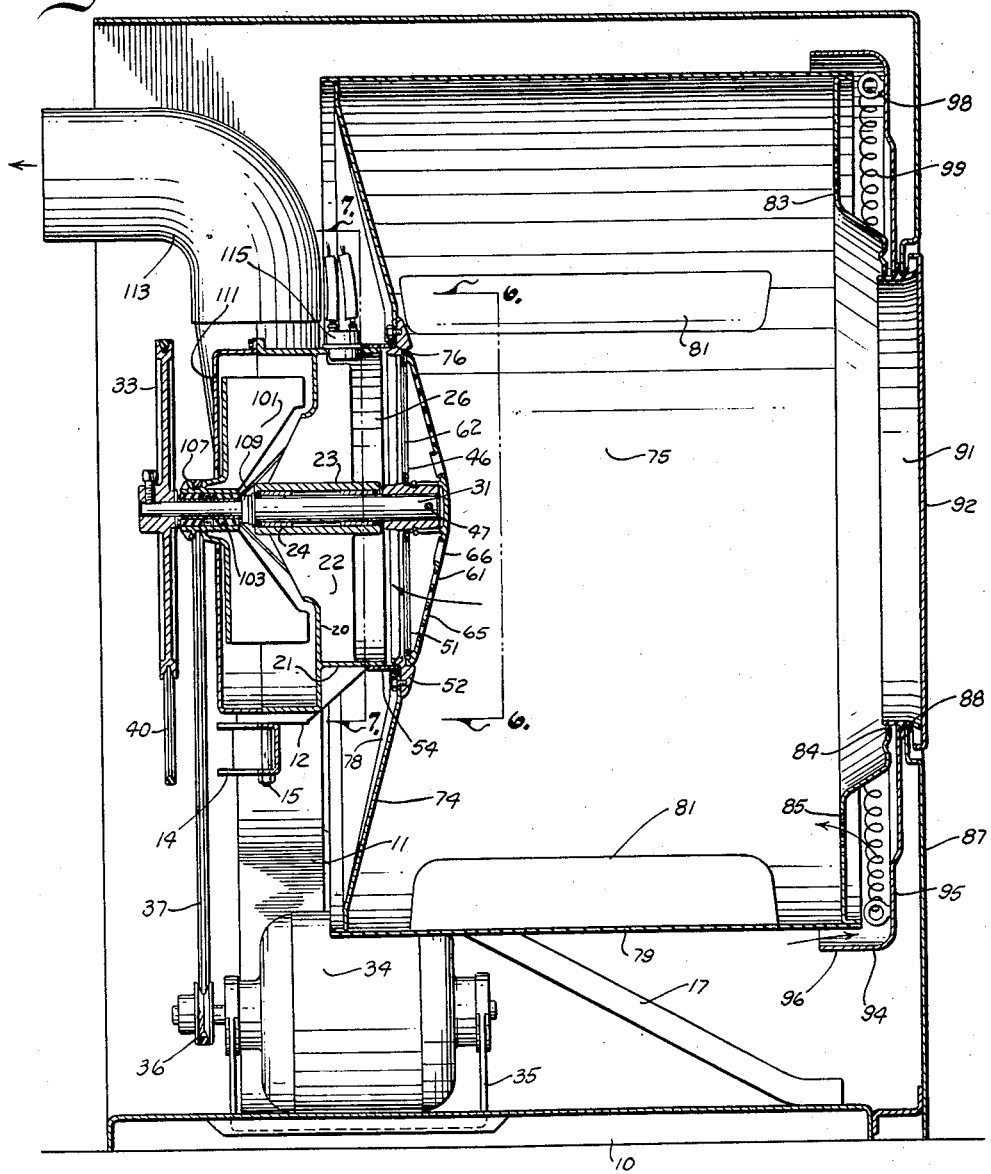
Figure 1 is a side elevational view of a clothes drier embodying my invention.

Figure 8 is an enlarged fragmentary sectional elevational view showing the assembly of the drum spider, lint screen and lint screen retainer incorporated in the drier shown in Figure 1; and, Figure 9 is an exploded view of the elements shown in Figure 8 showing the lint screen retainer and the lint screen separated from each other after the lint screen retainer has been removed from the drum spider.

In the accompanying drawings there is shown a clothes drier provided with a base frame 10 which serves as a support for the two upstanding channel brace members 11 which are connected at their upper ends to opposite sides of the hollow blower housing casting 12 by means of the tap bolts 13.

Blower housing 12 is prevented from pivoting about bolts 13 by the horizontal channel member 14 which is fastened to the lower periphery of housing 12 by means of the bolt 15 located midway between the opposite ends of channel member 14. Channel member 14 is welded to the vertical brace members 11 to provide a rigid three-point support for blower housing 12 and has its ends welded in turn to the two diagonal channel members 17 which form an acute angle with base frame 10 to which they are rigidly connected near the front edge of that base frame member (Figure 1). This construction not only supports blower housing 12 and all structure supported thereby but also prevents blower housing 12 from being moved back and forth about the lower ends of the vertical brace members 11.

Casting 12 includes a tubular portion 21 (Figure 1), a wall 20 having a rearwardly flared inner portion defining an intake into a scroll-shaped impeller chamber of blower housing 12, and, in this illustrative embodiment, four internal radially directed longitudinal webs 22 which converge toward each other to provide a bearing retainer hub 23 containing bearings 24. Member 23 cooperates with tubular member 21 to define a conduit or passageway 26 of four segments located between the tubular portion 21 and the bearing retainer 23. Since the supporting webs 22 are longitudinally continuous for support purposes only, the four-part passageway 26 can be for illustrative purposes termed a singular passageway concentric to the bearing retainer 23.

Mounted within the bearings 24 is the revoluble drum drive shaft 31 which projects from both ends of the casting member 12. The drum drive shaft 31 carries affixed at its rear, or left end as shown in Figure 1, a large pulley 33 which is driven by motor 34 through motor pulley 36, main belt 37, integral pulleys 38 and 39 and belt 40 to reduce the speed of motor 34 to the desired tumbling speed for drier operation. Mounting bracket 35 anchors motor 34 to frame 10.

The spring 42 connected between base frame 10 and the shaft 43 carrying pulleys 38 and 39 maintains both of belts 37 and 41 under the desired degree of tension. Shaft 43 is rigidly attached to the slide block 44 which is loosely retained in a cooperating guide 45 welded to one of the braces 11 (Figure 4) to allow a limited movement of shaft 43 in a vertical plane under the urging of spring 42 to take up the slack in belts 37 and 40.

The opposite or forward end of the drum drive shaft 31 is rigidly pinned to the drum spider member 46 by means of the cross pin 47 piercing both of the members 31 and 46. Drum spider member 46 includes a hub 48 which is provided with an annular groove or recess 49 and which is connected to the four radiating spokes 51 connected in turn to drum spider rim 52. A heat resistant felt sealing member or gland 54 encircles the front periphery of blower housing 12 and the circular shoulder 55 formed on the rear portion of drum spider 46.

The front face of the drum spider rim 52 includes a circular recess 57 which receives and cooperates with a two part lint trap assembly including the lint screen retainer member 61 and the lint screen 62. The lint screen retainer member 61 is provided with a longitudinally slotted hub portion 64 which, when expanded, may receive hub 48 of spider member 46 as shown in Figure 8.

The conical face of lint screen retainer member 61 is provided with a plurality of holes 65 permitting air flow therethrough and is further provided with a pair of diametrically opposed finger holes 66 to facilitate removal of members 61 and 62 from hub 48 and from each other as shown in the exploded view in Figure 9.

Figure 6:
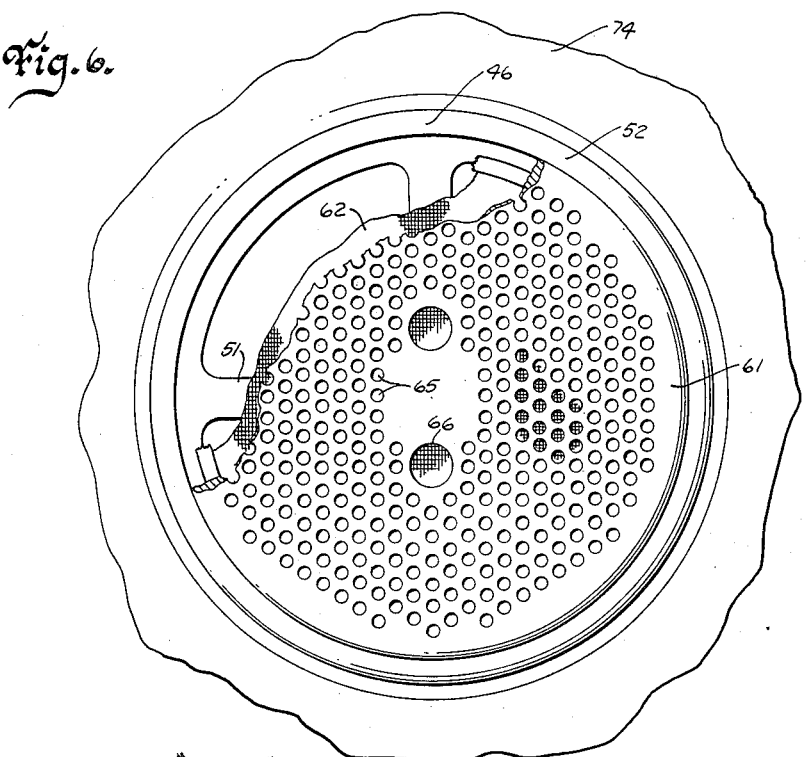
Figure 6 is an enlarged fragmentary view, partially broken away, taken on line 6—6 of Figure 1.
Figure 7:
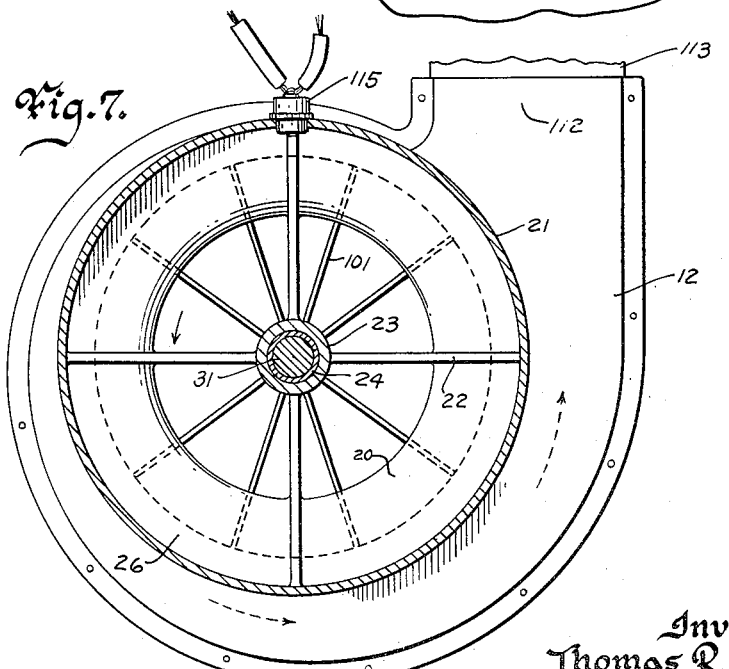
Figure 7 is an enlarged fragmentary view taken on line 7—7 of Figure 1.

The slotted portion 64 is encircled by a garter spring 68 which tends to collapse slotted portion 64 into a smaller diameter. When lint screen retainer member 61 has been removed from hub 48 of spider member 46, the slotted hub 64 collapses sufficiently to allow its insertion into the centrally located opening or aperture 71 of lint screen member 62 which in turn is received by the recess 72 located in the rear wall of lint screen retainer member 61. When the lint screen 62 is fitted over the slotted hub 64 of the lint screen retainer member 61, this two-part assembly can, by reason of the camming action of the flared ends 73 of the slotted hub 64, be pushed over the spider hub 48 where it will remain in place due to the action of garter spring 68 urging the curved ends 73 into the annular recess 49 of the drum spider member 46. Once these parts have been assembled in this position, the periphery of the lint screen retainer member 61 forms a lint tight seal in recess 57 while the expansible hub portion 64 in cooperation with garter spring 68 closes aperture 71 thereby effectively filtering all air passing through drum spider member 46 as apparent from an inspection of Figures 1, 6 and 8.

From those same figures it will be seen that rim 52 of drum spider member 46 is rigidly fastened to the rear wall 74 of the clothes drum 75 adjacent the periphery of the air exhaust opening 76 blanked out of the central portion of rear wall 74 so as to receive drum spider 46. The rear wall 74 is provided with a plurality of radial supporting ribs 78 which may be either embossed in the rear wall 74 or welded to the exterior of the drum 75 to strengthen and reinforce rear wall 74.

In the embodiment shown in the accompanying drawings, rear wall 74 is imperforate except for the centrally located air exhaust opening 76. The periphery of rear wall 74 is flanged to form a supporting shoulder for the imperforate cylindrical side wall 79 which carries the clothes elevating vanes 81 for tumbling clothing within drum 75 during rotation of the latter member.

The cylindrical side wall 79 joins the front wall 83 which is provided with a centrally located access opening 84 aligned with exhaust opening 76 and a circular perforate portion 85 located concentrically to access opening 84. This perforate portion 85 serves as the air intake into drum 75 and with the cooperation of exhaust opening 76, provides a transverse flow of air through drum 75 and its contents.

The cabinet 87 which is fastened to base frame 10 and which encloses the entire drying mechanism is provided with an access opening 88 which is aligned with the drum access opening 84 thereby allowing both of openings 84 and 88 to receive the door gasket 91 which is fitted into cabinet access opening 88 and protrudes through the drum access opening 84 into drum 75. The door panel 92 hinged to cabinet 87 abuts door gasket 91 to form an airtight seal for cabinet 87.

Fastened to cabinet 87 and located between cabinet 87 and the front drum wall 83 is a shroud member 94 which has an imperforate substantially circular front portion 95 and a short cylindrical portion 96 extending rearwardly beyond the junction of drum walls 79 and 83. Shroud 94 is provided with a blanked out centrally located opening to permit its encompassing of the door gasket 91 which is maintained in place by the cooperation between the stationary shroud 94 and cabinet 87.

Located between shroud 94 and the drum front wall 83 and maintained in place by insulated wire clips 98 fastened to shroud 94 is the open coil electric heating element 99 which extends completely around the inside of shroud 94 to preheat air from the ambient atmosphere passing into drum 75 through holes 85.

Figure 2:
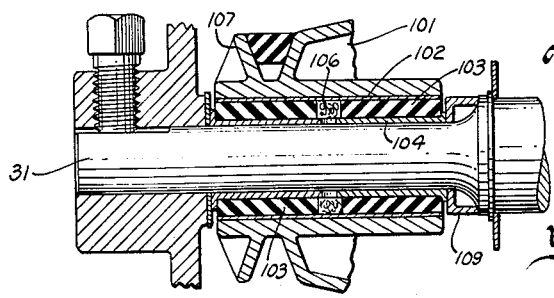
Figure 2 is an enlarged fragmentary view showing the relationship between the drum drive shaft and the impeller for producing air flow through the drier shown in Figure 1.
Figure 5:
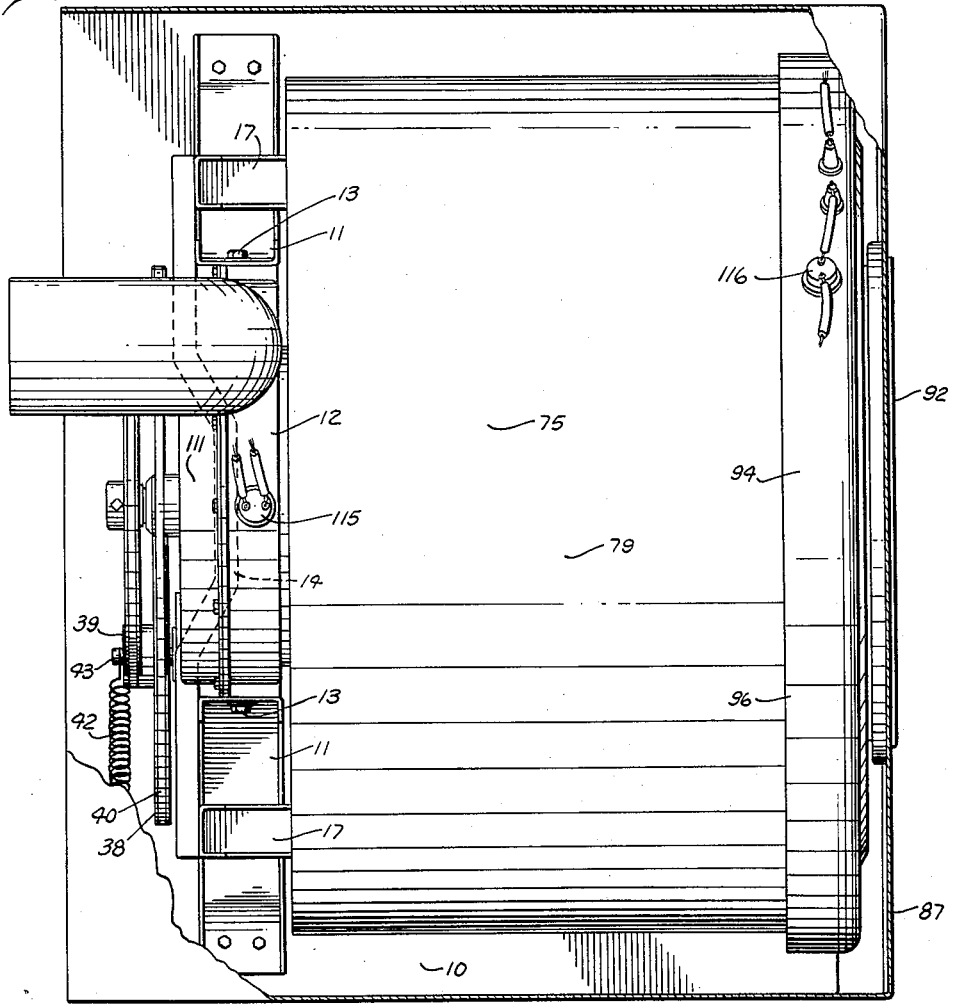
Figure 5 is a plan view, partially broken away, of the drier shown in Figure 1.

Air flow into drum 75 through perforate portion 85 and into the blower housing 12 is produced by rotation of the revoluble impeller 101 located in the scroll-shaped rear portion of that blower housing. The impeller 101 receives by means of a press fit a cylindrical steel sleeve 102 (Figure 2) which is bonded to two rubber cylindrical members 103 having inner surfaces bonded in turn to the two sintered bronze porous bushings 104 which are revolubly mounted on the step-down portion of the drum drive shaft 31. Wicking material 106 located between the two rubber sleeves 103 serves as an oil reservoir for bushings 104 and maintains proper lubrication for these bushings on shaft 31. The use of the rubber cylindrical sleeves 103 also aids in reducing the noise level during rotation of impeller member 101 which is driven approximately 1650 r.p.m. through the pulley 107 formed integrally with impeller member 101. The noise level is further reduced by use of the small bushings 104 on the step-down portion of shaft 31. The impeller pulley 107 is connected to the driving motor 34 by means of the main drive belt 37. A spacer collar 109 encircling the step-down portion of shaft 31 prevents axial movement of impeller member 101 toward the webs 22 of housing 12 while pulley 33 limits axial movement of impeller 101 in the opposite direction.

Impeller member 101 is enclosed by the scroll-shaped blower housing cover 111 which cooperates with and fits against casting 12 in a juxtapositional relationship to form an air discharge passageway 112 connected to the exhaust elbow 113 for venting the hot moist air from the interior of drum 75 to a remote atmosphere.

The blower housing casting 12 includes an opening near the upper portion of that housing to accommodate a control or cycling thermostat 115 which is connected in series with the heating element 99 in order to maintain the interior of drum 75 at the proper selected drying temperature. In practice this switch 115 has been set to open at approximately 135°. Other types of thermostats may also be used. Control thermostat 115 cycles on and off as the temperature of the air passing through the drying fabrics rises during the latter part of the drying operation.

Also connected in series with the heating element 99 is the safety or high limit switch 116 which is mounted on an upper part of a cylindrical portion 96 of shroud member 94 to disconnect heating element 99 from its source of power in case the temperature near the front of the drum should rise above a predetermined selected temperature during the operation of the clothes drier. In practice this switch 116 has been set to open at approximately 170°. Safety switch 116 opens, for example, in case of a clogged lint screen 62 or breakage of belt 37 causing cessation of rotation of impeller 101 either of which shuts off air flow through drum 75 and results in an overheating of the front that drum.

To operate the clothes drier shown in the accompanying drawings after clothes tumbler 75 has been loaded with moist clothing to be dried, power is supplied to motor 34 and to the heating element 99 through a control circuit forming no part of this invention. The energization of motor 34 causes drum 75 to rotate at approximately 50 r.p.m. while causing impeller member 101 to rotate at approximately 1650 r.p.m. to exhaust air from the blower housing 12 through the air discharge passageway 112 and exhaust elbow 113.

This pumping of air through exhaust elbow 113 creates a partial vacuum within drum 75 with the result that air from the ambient atmosphere flows into drum 75 through the perforate portion 85 after passing between shroud 94 and drum 75. Air entering drum 75 by way of this path is elevated in temperature after passing over the heating unit 99 located between drum 75 and shroud 94. In actual construction, a 4500 watt heating element has been used for this heat source.

Since the air flow through drum 75 is approximately 150 cubic feet per minute in actual construction, an effective transfer of heat from unit 99 to the interior of drum 75 is achieved while the operating temperature of the air within drum 75 is kept at a relatively low level thereby insuring a more safe and delicate drying operation of the fabrics within that drum. For example, in the actual construction of this machine, the temperature of the air flowing from exhaust elbow 113 is normally about 115° when a 4500 watt heating unit is used in conjunction to this preferred air flow. This large volume of relatively low temperature air entering drum 75 through the large area covered by holes 83 passes transversely through drum 75 and its contents and intermixes with these damp fabrics as they are tumbled by vanes 81 during the rotation of drum 75 to rapidly and efficiently evaporate moisture from these fabrics. While these satisfactory results are produced by the selection of the designated heating element, thermostats, air flow, etc., these design selections are meant to be illustrative and not limiting in any way.

The hot air passing from drum 75 through the lint screen retainer member 61 and the lint screen 62, by means of the suction produced by impeller 110, is filtered of its entrained lint prior to the exhausting of this hot moist air through the centrally located air exhaust opening 76.

While the preferred embodiment illustrated in the accompanying drawings has shown the air inlet for drum 75 to be positioned on the front wall of that drum to produce a transverse flow of air through that drum and its contents, this invention need not be limited to such a construction and may include those alternate constructions in which the air intake into the drum itself is provided in either the side or rear drum walls.

I claim:

1. In a clothes drier, a base member, upstanding framework mounted on said base member, a blower housing connected to and supported by said framework, a bearing supported by said blower housing, a wall within said housing defining a blower intake opening concentric to the longitudinal axis of said bearing, a revoluble shaft journalled in said bearing, a clothes receiving drum connected to said shaft, said drum having a rear wall provided with an air exhaust opening communicating with said blower housing, said drum further including an air intake opening, and air translating means positioned within said blower housing for moving air into said drum through said air intake opening and out of said drum into said blower housing by way of said air exhaust opening.

2. In a clothes drier, a base member, upstanding framework mounted on said base member, a blower housing connected to and supported by said framework, a bearing supported by said blower housing, said blower housing including a plurality of radially converging members supporting said bearing and a wall in juxtaposition to said converging members within said housing and defining a blower intake opening concentric to the longitudinal axis of said bearing, a revoluble shaft journalled in said bearing, a drum spider member connected to said shaft, a clothes receiving drum connected to said drum spider member and supported thereby, said drum having a rear wall provided with an air exhaust opening communicating with said blower housing, said drum further including an air intake opening, and air translating means positioned within said blower housing for moving air into said drum through said air intake opening and out of said drum into said blower housing by way of said air exhaust opening in said rear wall.

3. In a clothes drier, a base member, upstanding framework mounted on said base member, a blower housing connected to and supported by said framework, a bearing supported by said housing, said blower housing including a plurality of radially converging members supporting said bearing, a wall in juxtaposition to said converging members within said housing defining a blower intake opening concentric to the longitudinal axis of said bearing, a revoluble shaft journalled in said bearing, a clothes receiving drum connected to said shaft, said drum having a rear wall provided with an air exhaust opening communicating with said blower housing, said drum further including an air intake opening, and air translating means positioned within said blower housing for moving air into said drum through said air intake opening and out of said drum into said blower housing by way of said air exhaust opening in said rear wall.

4. In a clothes drier, a base member, upstanding framework mounted on said base member, a blower housing connected to and supported by said framework, a bearing within said blower housing, said blower housing including a plurality of radially converging support members supporting said bearing, a common wall joined to said radailly converging support members within said blower housing and defining a blower intake opening concentric to the longitudinal axis of said bearing, a revoluble shaft journalled in said bearing, a clothes receiving drum connected to said shaft, said drum having a rear wall provided with an air exhaust opening communicating with said blower housing and said blower intake opening, said drum further including a perforate portion, and air translating means revolubly mounted on said shaft and positioned within said blower housing for moving air into said drum through said perforate portion and out of said drum into said blower housing by way of said air exhaust opening in said rear wall.

5. In a clothes drier, a base member, upstanding framework mounted on said base member, a blower housing connected to and supported by said framework, said blower housing including a cylindrical portion and a scroll-shaped portion, a bearing within said blower housing, a plurality of radially convergent web members connected to and supporting said bearing within said blower housing, a common wall connected to said web members and defining a blower intake opening providing communication between said cylindrical portion and said scroll-shaped portion of said blower housing, a revoluble shaft journalled within said bearing, a clothes receiving drum connected to said shaft, said drum having a rear wall provided with an air exhaust opening aligned with said cylindrical portion and communicating with said blower housing, said drum further including an air intake opening, and an impeller member revolubly mounted on said shaft and positioned within said scroll-shaped portion of said blower housing for moving air into said drum through said air intake opening and out of said drum through said blower housing by way of said air exhaust opening and said blower intake opening.

6. In a clothes drier, a base member, upstanding framework mounted on said base member, a blower housing connected to and supported by said framework, a bearing within said blower housing, said blower housing including a cylindrical portion and a scroll-shaped portion, said blower housing including a plurality of longitudinally extending web members converging radially toward said bearing to support said bearing within said blower housing and define an air intake passageway into said blower housing, a common wall member positioned between said scroll-shaped portion and said cylindrical-shaped portion and connected to said web members, said wall member being provided with a blower inlet opening concentrically positioned with respect to said cylindrical portion and providing communication between said cylindrical portion and said scroll-shaped portion, a revoluble shaft journalled in said bearing, a clothes receiving drum connected to said shaft, said drum having a rear wall provided with an air exhaust opening aligned with said cylindrical portion and communicating with said blower housing and said blower inlet opening, said drum further including an air intake opening, and an impeller member revolubly mounted on said shaft and positioned within said scroll-shaped portion of said blower housing for moving air into said drum through said air intake opening and out of said air exhaust opening through said passageway and said blower inlet opening.

7. In a clothes drier, a base frame, a pair of upstanding members, a blower housing having opposite sides connected to said upstanding members in spaced relationship to said base frame, a cross member rigidly connected to said upstanding members and to said blower housing to provide a rigid connection between said blower housing and all of said members, a shaft journalled in said blower housing, a clothes receiving drum rigidly connected to and supported by said shaft, said drum having an opening communicating with said blower housing, an impeller member journalled on said shaft in said blower housing for moving air through said opening and said blower housing, and diagonal brace members connected between said cross member and said base frame for maintaining said blower housing in position.

8. In a clothes drier, a base member, upstanding framework mounted on said base member, a blower housing connected to and supported by said framework, a bearing supported by said blower housing, said blower housing including a wall within said housing defining a blower intake opening, a revoluble shaft journalled in said bearing, a clothes receiving drum connected to said shaft, said drum including a wall provided with an air exhaust opening positioned adjacent said blower housing and communicating therewith, a lint trap bridging said air exhaust opening to filter lint from air passing through said air exhaust opening, means frictionally connecting said lint trap to said shaft for rotation therewith, and air translating means positioned within said blower housing for moving air through said air exhaust opening and out of said drum into said blower housing.

9. In a clothes drier, a base member, upstanding framework mounted on said base member, a blower housing connected to and supported by said framework, a bearing supported by said blower housing, said blower housing including a wall member partitioning the interior of said housing and defining a blower intake opening concentric to the longitudinal axis of said bearing, a revoluble shaft journalled in said bearing, a clothes receiving drum having a rear wall provided with an air exhaust opening communicating with said blower housing, a drum spider member spanning said air exhaust opening and interconnecting said drum with said shaft, a lint trap assembly releasably clamped on said drum spider member for filtering lint from air passing through said air exhaust opening, said drum further including a front wall having an air intake opening, and air translating means positioned within said blower housing for moving air transversely through said drum by way of said air intake opening and said air exhaust opening.

10. In a clothes drier, a blower housing including an impeller chamber and an air intake passageway, a wall member between said impeller chamber and said air intake passageway defining a blower intake opening, a revoluble shaft journalled in a bearing supported by said blower housing and extending into said impeller chamber and through said air intake passageway, a clothes receiving drum rigidly connected to said shaft and provided with an exhaust opening positioned adjacent to and communicating with said air intake passageway, means for heating the interior of said drum, an impeller revolubly mounted on said shaft within said impeller chamber for moving air from said drum through said exhaust opening and through said air intake passageway, and temperature responsive means sensing the air temperature leaving said drum as sensed within said air intake passageway for terminating operation of said heating means above a predetermined air temperature within said air intake passageway.

11. In a clothes drier, a blower housing provided with an air intake opening, a bearing supported by said blower housing, said blower housing including a wall within said housing defining a blower intake opening concentric to the longitudinal axis of said bearing, a shaft journalled in said bearing, a clothes receiving drum provided with an exhaust opening communicating with said air intake opening of said blower housing, a drum spider member spanning said exhaust opening and rigidly interconnecting said drum and said shaft to provide the sole support for said drum, and air translating means for moving air through said exhaust opening into said blower housing by way of said air intake opening.

12. In a clothes drier, a blower housing provided with an air intake opening, a bearing supported by said housing, a shaft journalled in said bearing, a clothes receiving drum provided with an exhaust opening communicating with said air intake opening of said blower housing, a drum spider member spanning said exhaust opening and rigidly interconnecting said drum and said shaft to provide the sole support for said drum, air translating means for moving air through said exhaust opening into said air intake opening of said blower housing, and a lint trap bridging said drum spider and frictionally attached thereto for filtering lint from air passing through said exhaust opening.

13. In a clothes drier, a blower housing including a cylindrical air intake portion, a bearing supported by said blower housing, a shaft journalled in said bearing, a clothes receiving drum provided with a wall having a centrally located exhaust opening aligned with said cylindrical intake portion of said blower housing, a drum spider member spanning said opening and rigidly interconnecting said drum and said shaft to provide the sole support for said drum, air translating means for moving air through said centrally located exhaust opening, and a lint trap assembly frictionally fitted against said drum spider member for filtering lint from air passing through said centrally located exhaust opening.

14. In a clothes drier, drum support means including a hollow cylindrical portion, a bearing supported by said hollow cylindrical portion, a wall member in said hollow cylindrical portion defining a blower intake opening concentric to the longitudinal axis of said bearing, a revoluble drum support shaft journalled in said bearing and extending from said cylindrical portion, a clothes receiving drum including a wall having an opening therein, a drum spider member spanning said opening and rigidly interconnecting said drum and said shaft to form a sole support for said drum, air translating means for moving air through said opening and into said hollow cylindrical portion, and lint trap means frictionally fitted against drum spider member for rotation with said drum to filter lint from air passing through said opening.

15. In a clothes drier, a clothes receiving drum having a central opening therein, a shaft extending through said opening, a drum spider spanning said opening and rigidly interconnecting said drum and said shaft, a hub member connected to said drum spider, means for moving air from said drum through said opening, a lint screen member extending over said opening for filtering lint from air flowing through said opening, and a lint screen retainer member frictionally engageable with said central hub member for receiving and maintaining said lint screen member in place over said opening.

16. In a clothes drier, a revoluble drum having a central opening therein, means for moving air from said drum through said opening, a drum spider member fastened to said drum and bridging said opening, a lint screen extending over said opening for filtering lint from air passing through said opening, a hub member connected to said drum spider member, and a perforate lint screen retainer member receiving said lint screen and frictionally engageable with said central hub member for maintaining said lint screen in place over said opening.

17. In a clothes drier, a revoluble drum including a wall provided with an opening therein, means for moving air through said opening, a drum spider member fastened to said wall and bridging said opening, a hub member connected to said spider member and aligned with the axis of rotation of said drum, a lint screen extending over said opening for filtering lint from air passing through said opening, and a lint screen retainer member for receiving said lint screen and including an expansible hub cooperating with said hub member for maintaining said lint screen in place over said opening.

18. In a clothes drier, a revoluble drum having a wall provided with an opening therein, a drum spider member fastened to said wall and bridging said opening, means for moving air from said drum through said opening, a hub member connected to said spider member and aligned with the axis of rotation of said drum, a lint screen member extending over said opening for filtering lint from air passing from said drum, a centrally located aperture in said lint screen member, a lint screen retainer member having an expansible hub portion insertable in said aperture, resilient means biasing said expansible hub portion toward a collapsed position for its insertion in said aperture of said lint screen member, said hub member receiving said expansible hub portion in a telescoping relationship against the bias of said resilient means and maintaining said lint screen retainer member and said lint screen member in place over said opening.

19. In a clothes drier, a revoluble clothes receiving drum including a wall having an opening providing for discharge of air from said drum, a drum spider member connected to said wall and spanning said opening, a hub member connected to said drum spider member, an annular groove in said hub member, a lint screen covering said opening for filtering lint from air passing from said drum, said lint screen having an aperture therein, a perforate lint screen retainer receiving said lint screen and having an expansible hub portion insertable into said aperture of said lint screen, spring means encircling said hub portion and biasing said hub portion into a contracted position for its insertion into said aperture of said lint screen, said hub portion further including flared marginal portions for camming said hub portion over said hub member into an expanded position whenever said lint screen retainer is manually fitted onto said hub member, said spring means urging said marginal portions into said annular groove for maintaining said lint screen retainer in its assembled position.

20. In a clothes drier including a wall, an opening in said wall, means for moving air through said opening, a lint screen extending over said opening for filtering lint from air passing through said opening, a lint screen retainer receiving said lint screen and maintaining said screen over said opening, an aperture in said lint screen, said lint screen retainer including an expansible portion, means biasing said expansible portion toward a contracted position to permit its insertion into said aperture, and a hub member positioned adjacent said opening for insertion into said expansible portion to move said latter member into an expanded position for maintaining said lint screen retainer in place on said hub member.

21. The invention set forth in claim 20 in which said lint screen retainer member is perforate and includes finger holes enabling manual separation of said lint screen retainer member from said hub member.

References Cited in the file of this patent

UNITED STATES PATENTS

| | | |
|---|---|---|
| 2,262,186 | Lindberg | Nov. 11, 1941 |
| 2,521,712 | Geldhof | Sept. 12, 1950 |
| 2,546,925 | Geldhof et al. | Mar. 27, 1951 |
| 2,608,769 | O'Neil | Sept. 2, 1952 |
| 2,645,033 | Kling et al. | July 14, 1953 |
| 2,722,057 | Pugh | Nov. 1, 1955 |